United States Patent Office 3,132,068
Patented May 5, 1964

3,132,068
SOLID ALKALI IODIDE COMPOSITIONS AND PROCESS FOR PRODUCING THE SAME
Abraham Sidney Behrman, Chicago, Ill., assignor to Chilean Nitrate Sales Corporation, New York, N.Y., a corporation of New York
No Drawing. Filed Apr. 25, 1960, Ser. No. 24,229
28 Claims. (Cl. 167—17)

This invention relates to iodides. More particularly the present invention relates to improved methods for the preparation of novel hydrated compositions containing alkali metal iodides.

The present application is a continuation-in-part of the copending United States patent application Serial No. 836,576, filed August 28, 1959, by the applicant herein, now abandoned.

The commercial and economic importance of the iodides has long been recognized and large quantities of potassium iodide and sodium iodide are now commonly used in the manufacture of various foods, animal feeds, photographic materials, medicinal preparations, sanitizing compositions and other products. Until recently, however, the methods by which the iodides have been produced commercially have been quite cumbersome and expensive. Thus, for example, potassium iodide was prepared normally by one of several methods. According to one of these, iodine was dissolved in a solution of potassium hydroxide or potassium carbonate and the solution evaporated to dryness, the dry residue being mixed with powdered carbon, the mixture was then heated in a furnace to effect reduction of the iodate and the resulting mass extracted with water and potassium iodide recovered by crystallization. According to a second of the aforesaid procedures, iodine and iron were reacted in the presence of water to form ferrous iodide, the solution recovered, additional iodine added to convert the ferrous iodide to ferric iodide, and the resulting solution reacted with potassium hydroxide or potassium carbonate, a large volume of ferric hydroxide being precipitated and potassium iodide remaining in solution. Each of these procedures is, however, complicated, and involves process steps which, in commercial operation, are quite expensive.

Marked improvements over such processes have been attained by the methods for preparing iodides disclosed in the prior patents of applicant, U.S. Patent 2,800,390, issued July 23, 1957, and U.S. Patent 2,828,184, issued March 25, 1958. As disclosed therein elemental iodine is reacted in substantially stoichiometric proportions with the hydroxide of an alkali metal or an alkaline earth metal in the presence of water to form iodide and iodate, typically in such high concentrations that much of the iodate is precipitated. With or without separation of the precipitated iodate, the reaction mixture is contacted with an amphoteric metal, advantageously aluminum, to reduce iodate to iodide, any residual amphoteric metal hydroxide in solution being precipitated by lowering the pH of the solution to the isoelectric range of the amphoteric metal hydroxide. The clarified solution is of such high concentration and purity that it can be dried directly, without partial evaporation, crystallization, separation of mother liquor or like preliminary steps. The product so obtained is very pure, meeting, for example, all the specifications for U.S.P. grade in the case of potassium iodide.

Although such prior art processes have achieved commercial acceptance, and while the methods proposed in the patents of the applicant herein and referred to above have made feasible decided economies in manufacturing; it will be noted that all such processes require the recovery of the iodide in some way from a solution thereof, whether by evaporation to crystallization followed by separation of the mother liquor, or by direct drying, through added heat, as in my aforementioned patents. Since such recovery is at best quite difficult and expensive, it reprsents a distinct disadvantage. This is particularly true when the iodide solution is dilute, since a whole series of interconnected operations is then required, including single or multi-effect evaporation, one or more crystallizations, filtration or centrifuging, washing of the crystals and, finally, drying them. Even where the solution is such that it can be dried directly, as with a spray drier or a drum drier, the drying apparatus is not economical for small or intermediate scale production.

Thus, a general object of the present invention is to devise a method for producing iodides wherein the aforementioned disadvantages are eliminated.

Another object is to provide an improved method for producing iodides of the alkali metals.

A further object is to provide a simple, inexpensive method for producing solid, water-soluble iodides from elemental iodine without requiring evaporation, crystallization, thermal drying or like steps for recovery of a solid product.

An additional object is to devise such a process wherein the entire reaction mixture employed is converted directly to solid form without removal of water therefrom.

Yet another object is to provide a process for producing alkali metal iodide compositions wherein small amounts of stabilizing compounds are provided throughout the finished product without requiring introduction of such compounds as a process step added only to accomplish stabilization.

A still further object is to provide novel and useful non-hygroscopic iodide products.

Another object is to provide, as a new composition of matter, an alkali metal iodide composition stabilized by small but effective amounts of stabilizing agents molecularly dispersed throughout the composition.

A further object is to provide inexpensive, stable water-soluble alkali metal iodide compositions particularly useful in the fields of disinfection and sanitization as sources of or solubilizers for iodine.

In brief, the process of the present invention comprises forming a uniform fluid mixture in one or a plurality of steps of water, iodine, an alkali, e.g. an alkali-metal containing base, and an alkali metal-containing reducing agent; at least one of said alkali and said reducing agent containing a sodium moiety therein, to form a solid, hydrated composition containing as one of its constituents an alkali metal iodide.

The reaction involved, either as a single step or sequence of steps, is, in essence, one of oxidation and reduction. The agency responsible for the hydrated character of the final product, and formed directly or metathetically during the reaction, is the alkali metal iodide and/or the aforesaid agent introduced for its reducing properties subsequent to its oxidation. The incorporated water of hydration is normally that present at the termination of the reaction and that introduced or evolved during the course thereof.

Accordingly, the method of the invention may be said to comprise preparing an alkali metal iodide in solid form including contacting water and one of the following: (1) unreacted elemental iodine and an unreacted alkali metal containing base, (2) an unreacted alkali metal containing base, (3) an intermediate reaction product, the iodate resulting from reaction of said iodine and said alkali metal containing base, and (4) mixtures thereof; with a reducing agent, e. g. an alkali metal sulfite, capable of reducing at least said iodate and preferably, one competent to effect reduction of the aforesaid iodine and iodate; and adding to the mixture so formed such of the enumerated substances, if any, listed above as are still absent therefrom after addition of the reducing agent; thus effecting the formation of the alkali metal iodide; and at least one of the aforesaid products present in the final reaction mixture, the iodide or the oxidized derivative of the reducing agent, being capable of taking up as water of hydration the aqueous phase of the reaction mixture to permit, and indeed effect, formation of a hard, dry non-hygroscopic solid.

Illustratively, an advantageous form of the invention involves establishing a uniform fluid mixture of elemental iodine, an alkali and a predetermined small amount of water to provide an initial reaction mixture in which part of the iodine is converted to iodide and iodate, and sequentially distributing through the resulting reaction mixture a reducing agent which is at least appreciably or substantially water-soluble, to effect reduction of the iodate to iodide with concomitant oxidation of the reducing agent; either or both of said iodide and the oxidized derivative of the reducing agent then taking up the aqueous phase of the mixture as water of hydration to form a solid dry product.

A similarly advantageous procedure comprises employing the same reactants in the same proportions as in the reaction described immediately above; the variation in the procedure being the inclusion in the initial mixture of alkali and reducing agent together with a small predetermined amount of water and subsequent addition of iodine thereto. An inherent feature of this latter method is the indication of the sufficiency or insufficiency in quantity of reducing agent present rendered by decolorization of the sequentially added iodine.

While the amounts of reagents used in the aforesaid procedures are normally identical, the chemistry involved is significantly distinct. Thus, in the first method, referred to as (1) in the reaction sequence appearing hereinafter and employing, for purpose of the present discussion, an alkali metal hydroxide as the alkali and an alkali metal sulfite as the reducing agent, it will be evident that the iodine reacts with the alkali metal hydroxide to form the corresponding alkali metal iodide and iodate, the sequentially added sulfite then reducing the iodate to iodide. In the second method, described above, and referred to as (2) in the following reaction sequence, the alkaline sulfite is used to reduce iodine directly.

Thus:

(1)    $3I_2 + 6OH^- \longrightarrow 5I^- + IO_3^- + 3HOH$
       $IO_3^- + 3SO_3^{--} \longrightarrow I^- + 3SO_4^{--}$
(2)    $6OH^- + 3SO_3^{--} + 3I_2 \longrightarrow 6I^- + 3SO_4^{--} + 3HOH$ A third approach to the reaction involves the same reactants and comprises simultaneous introduction of all the aforesaid components into admixture with one another in quantities substantially equivalent to those employed in the procedures described above.

The alkali metal present in the product iodides described above is derived from the initial alkali metal-containing base, which is preferably an alkali metal hydroxide, wherein the alkali metal is normally sodium or potassium. Carbonates such as, for example, sodium or potassium carbonate or the corresponding bicarbonates can also be employed, but present a marked foaming problem. Similarly the reducing agent is preferably a sodium or potassium sulfite or metabisulfite. As noted hereinabove, it is essential that either the alkali from which the alkali metal present in the product iodide is derived or the reducing agent which appears as the corresponding oxidized derivative thereof in the final product contain sodium; since it is only the iodide or oxidized derivative of the reducing agent containing this latter alkali metal that presents the requisite hydrating characteristics.

Thus, by way of further illustration, where sodium hydroxide is employed with anhydrous sodium sulfite as the reducing agent, the oxidation-reduction reaction may be illustrated by the following sequence:

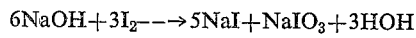

The iodate thus formed, $NaIO_3$, is then reduced as follows:

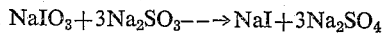

The resulting sodium sulfate may be hydrated by the aqueous phase of the reaction mixture and carried even to the most highly hydrated form, the decahydrate $Na_2SO_4 \cdot 10HOH$, commonly known as Glauber's salt. In this instance then the sulfate will share substantial responsibility for taking up the aqueous phase of the reaction medium as water of crystallization. Where potassium hydroxide is substituted for sodium hydroxide in the above reaction sequence the iodide of the final product will be potassium iodide and the sulfate may be the sole hydrating component therein. On this basis the use of sodium hydroxide would appear to have the advantage particularly where the corresponding iodide thereof is formed in an intermediate step of taking up water of crystallization during the course of the reaction and prior to formation of the final composition.

Contrasting with these reactions are the following wherein a potassium sulfite is employed as the reducing agent and the alkali metal hydroxide is sodium hydroxide:

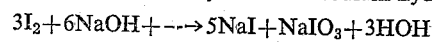

The iodate thus formed, $NaIO_3$, is then reduced with the aforesaid potassium sulfite:

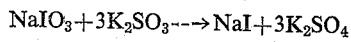

The sodium iodide, NaI, takes up the aqueous phase of the reaction product mixture in this instance as water of crystallization to form a similarly hard, solid mass to that obtained where the sulfate operates to accomplish this objective. The reaction, as noted above, may be substantially slowed, but permits continued mixing of the reaction product which presents itself as a thin paste prior to solidification. The time involved is normally convenient for this purpose without being unduly extended.

While anhydrous sulfites such as sodium and potassium sulfite are most advantageously employed in the practice of the present invention, the invention is not limited to these specific agents. Any reducing agent can be employed which is at least appreciably soluble in water and is capable of reducing iodate, and/or iodine, to iodide. An additional qualification is pertinent in those reactions such as described above, wherein the iodide of the final product is not a hydrate, e.g. potassium iodide. In these instances, it is necessary to provide an oxidation product e.g. $Na_2SO_4$, capable of taking up as water of hydration at least a sufficient proportion of the water of the reaction mixture so as to form a solid product. The reducing agent employed may function through either cationic or anionic oxidation.

Anhydrous sodium and potassium sulfite are most advantageously employed as reducing agents in the practice of the present invention since they are both available at low cost in finely particulate form, in which state they are easily dispersible uniformly throughout the pasty reaction mixtures employed. Anhydrous sodium sulfite is particularly effective as the reducing agent in those instances where the oxidized derivative thereof will constitute the sole hydrating agent in the final compositions of the invention. This is so since the oxidation product may, as noted, exist in more than one state of hydration and is capable of taking up a relatively large amount of water. Then, the hydrated sodium sulfate, especially the decahydrate, is efflorescent and water of hydration given off thereby tends to balance hygroscopicity of the iodide, so that it is only in a humid atmosphere that the compositions of the invention pick up moisture. Finally, sodium sulfate is innocuous insofar as many of the uses for which the iodides are suitable are concerned. This latter statement is equally true of potassium sulfate as well. Also advantageously employed in this respect is potassium metabisulfite, $K_2S_2O_5$, which contains a second $SO_2$ unit, which renders the compound a strong reducing agent, and requires an equivalent quantity of alkali to neutralize its acidity.

The practice of the present invention can be carried out either in batch or continuous operation. In either case, the reaction mixture is in a form sufficiently fluid to allow easy handling. It remains in this state for a variable period of time after the completion of the oxidation-reduction reaction, depending on whether the agency of hydration resides in the oxidized derivative of the reducing compound or in the iodide itself, as noted above. However, in either instance, the reaction mixture at this stage can be poured or otherwise conveyed from the reaction zone to a container or containers suitable for retaining the material as it sets up to fully hardened condition. The reaction mixture can be allowed to harden and the solid product then disintegrated in any conventional fashion. Alternatively, the still-fluid reaction mixture can be subdivided, so that hardening occurs in the particle form. Thus, for example, the reaction mixture can be subdivided in a shot tower operation while still in the form of a paste. The hardening of the reaction mixture should be accomplished in an atmosphere of reasonably low humidity. The hardened product can be heated to remove the water of hydration, when it is desired to increase the effective concentration of iodide in the final product.

The reactants are employed in proportions which are substantially stoichiometric for the reactions involved. In this regard, a particular and important advantage is attained by employing a slight exces of both the alkali and the reducing agent, so that the finished product contains tiny stabilizing amounts of these materials in free, unreacted form. It is well known that stabilization of iodides in iodized salt, animal feeds, and the like is very difficult to accomplish. The molecularly dispersed and tightly bound alkali and sulfite in the iodide compositions described herein provide an exceptionally effective means of stabilization.

The temperature at which the method steps are carried out is not critical and room temperature operation can be conveniently employed. The process is overall an exothermic one, and an operation without external heating can be conveniently employed.

Thus, the final and novel compositions, prepared as described herein present a homogeneous solid mixture comprising alkali metal, iodide, the oxidation product of the reducing agent, and water, the latter being present substantially entirely as water of hydration.

Compositions in accordance with the invention find utility wherever the alkali metal iodides can be employed without the requirement of complete purity. The compositions are, for example, especially advantageous for use in the fields of disinfection and sanitization as sources of or solubilizers for iodine.

The following examples are further illustrative of the invention:

Example 1

Ninety-six (96) parts by weight of sodium hydroxide (97% NaOH) are dissolved in 80 parts of water, and 300 parts of elemental iodine are then mixed with the aqueous solution. Considerable heat is liberated in this process resulting in a pronounced increase in temperature of the reaction mixture. The iodine and sodium hydroxide react to form sodium iodide and sodium iodate. Because of the highly concentrated nature of the reaction mixture and the effect of the common sodium ion, a substantial proportion of the sodium iodate and possible also some anhydrous and/or hydrated sodium iodide so formed precipitates. The resulting product, including the precipitate, forms a relatively thin paste having sufficient fluidity to allow it to be worked readily.

To this thin paste is now added 155 parts by weight of anhydrous sodium sulfite in finely divided form. The resulting thicker mixture is mixed rapidly and vigorously to accomplish a prompt and uniform dispersion of the sodium sulfite. As soon as dispersion of the sodium sulfite has been accomplished, the still-fluid mixture is poured into a shallow tray and allowed to stand at room temperature in an atmosphere of relatively low humidity. Within a few minutes, the product assumes a rock-like hardness. The hardened product is disintegrated, sized and packaged in moisture-proof containers.

The proportions of the reactants employed in this example are such as to provide a slight excess of both sodium hydroxide and sodium sulfite over the amounts needed for complete reaction. Hence, the finished product contains very small amounts of free sodium hydroxide and free sodium sulfite which are effective to stabilize the iodide. Such small, stabilizing quantities of free sodium hydroxide and free sodium sulfite are in molecular dispersion throughout the hardened product and are held in that condition inescapably.

Save for the tiny amounts of sodium hydroxide and sodium sulfite just mentioned, analysis of the finished product is as follows:

| | Percent (by weight) |
|---|---|
| Sodium iodide | 57 |
| Sodium sulfate (anhydrous basis) | 27 |
| Water (as water of hydration) | 16 |
| Total | 100 |

Example 2

The procedure of Example 1 is repeated, using 155 parts by weight of potassium hydroxide (85% by weight KOH) in place of the sodium hydroxide and reducing the amount of water to 40 parts by weight. As in Example 1, the product begins to set after standing for a few minutes at room temperature and becomes rock-hard after several hours. The final reaction product mixture comprises chiefly potassium iodide and hydrated sodium sulfate. Sodium iodide dihydrate, free potassium hydroxide, sodium sulfite, potassium sulfate and anhydrous sodium sulfate may also be present in reduced amounts.

Example 3

Ninety-six (96) parts by weight of sodium hydroxide (97% NaOH) are dissolved in 80 parts water, the heat of solution of the alkali raising the temperature sufficiently to effect substantially complete solubility. With this solution 30 parts elemental iodine are mixed, reacting to form sodium iodide and sodium iodate, and producing a pasty, light yellow brown mass. To this paste is now added 200 parts anhydrous potassium sulfite, preferably finely powdered. The mixture resulting from this addition is at first rather dry, but on continued mixing it gradually becomes moist, and eventually wet enough to flow. Typically, after a combined mixing and standing period of 10 to 15 minutes, the reaction mixture sets to a white or light buff-colored (depending chiefly on the absence or presence of iron in the reactants) semi-solid mass, which in a few hours hardens into a dry, rock-like product. The combined amounts of iodine and water therein are 44.4 percent by weight and 14.9 percent by weight respectively of the final composition.

In the preparation just described, it may be assumed that the potassium sulfite reduces to iodide the iodate formed by the initial reaction of the iodine and sodium hydroxide. These two sequential reactions may be shown by the following equations:

$$3I_2 + 6NaOH \rightarrow 5NaI + NaIO_3 + 3H_2O \quad (1)$$

$$NaIO_3 + 3K_2SO_3 \rightarrow NaI + 3K_2SO_4 \quad (2)$$

which may be followed in whole or in part by this metathesis as the final reaction mixture solidifies:

$$xNaI \cdot 2H_2O + yK_2SO_4 \rightarrow zNa_2SO_4 \cdot 10H_2O + wKI \quad (3)$$

*Example 4*

The same reactants are employed, and in the same proportions, as in Example 3. Ninety-six (96) parts by weight of sodium hydroxide (97%) are dissolved in 80 parts of water, as before. To this solution is added 200 parts of anhydrous powdered potassium sulfite which is mixed thoroughly. The result is a thin paste. To this mixture is now added 300 parts of elemental iodine, preferably finely powdered. Additions of the iodine may be made a little at a time, with constant mixing, to avoid loss of iodine in fumes. Mixing is continued for a total of about 10 minutes. In about 15 minutes the mixture begins to set, and soon becomes quite hard. In several hours it is a rock-like white or light buff-colored mass, depending on the purity of the reactants. The combined amounts of iodine and water therein are 44.4 percent and 14.9 percent by weight respectively of the final composition.

In the procedure of this example, the alkaline sulfite is used to reduce the iodine directly:

$$6OH^- + 3SO_3^{--} + 3I_2 \rightarrow 6I^- + 3SO_4^{--} + 3H_2O$$

*Example 5*

The particulate solid product obtained in Example 1 is heated in a conventional hot gas rotary drier, with the product temperature maintained in the range of 50–100° C., for one hour to substantially decrease the water content and thus provide a high proportion of sodium iodide in the finished product. In general, it is found to be desirable to use large quantities of drying air at lower temperatures rather than small quantities at higher temperatures in the early part of the drying operation.

*Example 6*

The solid product of Example 3 is disintegrated and heated in the manner described in Example 5, the temperature, however, being maintained in the range of 103° C. to 108° C. for nineteen hours to effect a decrease in the water content thereof by 12.84 percent in weight.

*Example 7*

A solid product prepared as described in Example 4 is disintegrated and heated by the procedure described in Example 5 to effect a decrease in the amount of water contained therein of 11.36 percent by weight.

What is claimed is:

1. The method for preparing alkali metal iodide in solid form comprising establishing a uniform fluid mixture comprising, in substantially stoichiometric porportions, alkali metal iodate, alkali metal iodide, water and an alkali metal sulfite for (*a*) reducing said iodate to iodide, and (*b*) forming a solid oxidation product capable of taking up water as water of hydration, and causing said mixture to set to a dry solid product.

2. The method for preparing alkali metal iodide in solid form comprising establishing a uniform fluid mixture in substantially stoichiometric proportions of an alkali metal iodate, and an alkali metal sulfite for reducing said iodate to an iodide, and water; said iodide taking up water as water of hydration, and causing said mixture to set to a dry solid product.

3. In the production of an alkali metal iodide in solid form by reacting elemental iodine with an alkali metal hydroxide in a reaction mixture containing water, the improvement that comprises distributing through said reaction mixture an alkali metal sulfite in proportion for substantially stoichiometric reaction with the iodate formed in the reaction mixture; the alkali metal of at least one of said hydroxide and said sulfite being sodium.

4. In the production of an alkali metal iodide in solid form by reacting elemental iodine with an alkali metal hydroxide in a reaction mixture containing water, the improvement that comprises, uniformly distributing through said reaction mixture anhydrous sodium sulfite in proportion for substantially stoichiometric reaction with the iodate formed in the reaction mixture.

5. In the production of an alkali metal iodide in solid form by reacting elemental iodine with sodium hydroxide in a reaction mixture containing water, the improvement that comprises uniformly distributing through said reaction mixture potassium sulfite in proportion for substantially stoichiometric reaction with the iodate formed in the reaction mixture.

6. The method for producing alkali metal iodide in solid form comprising forming an initial reaction mixture containing, in substantially stoichiometric proportions, elemental iodine and alkali metal hydroxide, said initial reaction mixture also containing water in an amount sufficient to form a pasty mass; intimately mixing with said reaction mixture an alkali metal sulfite in proportion for substantially stoichiometric reaction with the alkali metal iodate formed in the reaction mixture, whereby the iodate is reduced to iodide and the sulfite is converted to sulfate, at least one of said alkali metal hydroxide and said sulfite containing sodium as a component thereof; and allowing the reaction mixture to set to a dry solid as the water content thereof is taken up as water of hydration.

7. The method of claim 6 wherein the amount of alkali metal hydroxide and alkali metal sulfite employed are slightly in excess of the stoichiometric proportions, whereby the dry solid product contains stabilizing quantities of alkali metal hydroxide and alkali metal sulfite dispersed molecularly therethrough.

8. The method for producing sodium iodide in solid form comprising forming an initial reaction mixture comprising substantially stoichiometric proportions of elemental iodine and sodium hydroxide, said initial reaction mixture also containing water in an amount sufficient to form a pasty mass, intimately mixing with said reaction mixture anhydrous sodium sulfite in proportion for substantially stoichiometric reaction with the sodium iodate formed in the reaction mixture, whereby the iodate is reduced to iodide and the sodium sulfite is converted to sodium sulfate, and then allowing the reaction mixture to set to a dry solid as the water content thereof is taken up as water of hydration.

9. The method for producing sodium iodide in solid form comprising forming an initial mixture comprising substantially stoichiometric proportions of elemental iodine and sodium hydroxide, said initial reaction mixture also containing water in an amount sufficient to form a pasty mass, intimately mixing with said reaction mixture potassium sulfite in proportion for substantially stoichiometric reaction with the sodium iodate formed in the reaction mixture, whereby the iodate is reduced to iodide and the potassium sulfite is converted to potassium sulfate, and then allowing the reaction mixture to set to a dry solid as the water content thereof is taken up as water of hydration.

10. A method for preparing alkali metal iodide in solid dry form which comprises forming in substantially stoichiometric proportions a mixture of an alkali metal hydroxide, and an alkali metal sulfite as a reducing agent for elemental iodine and water, said elemental iodine being sequentially introduced into said mixture in substantially stoichiometric proportion; said sulfite being simultaneously oxidized to form its corresponding sulfate; at least one of said iodide and said sulfate being capable of taking up as water of hydration the aqueous phase of the resulting reaction mixture thereby causing said reaction mixture to form a hard, dry solid.

11. The method for preparing sodium iodide in solid form comprising establishing a uniform fluid mixture composed of, in substantially stoichiometric proportions, sodium hydroxide, and potassium sulfite as a direct reducing agent for elemental iodine, and water, said elemental iodine being sequentially introduced into said mixture in substantially stoichiometric proportions and thereby converted to the iodide of sodium; said sulfite reducing agent being oxidized to the corresponding sulfate; said sodium iodide being capable of taking up water as water of hydration thereby causing said reaction mixture to form a hard, dry solid.

12. The method for producing alkali metal iodide in solid form, comprising forming a mixture in substantially stoichiometric proportions of sodium hydroxide, potassium sulfite and water; intimately mixing elemental iodine therewith in proportion for substantially stoichiometric reaction with the aforesaid hydroxide and sulfite, whereby the iodine is directly reduced to sodium iodide and the potassium sulfite is oxidized to potassium sulfate, and then allowing the reaction mixture to set to a dry solid as the water content thereof is taken up as water of hydration.

13. The method of claim 12 wherein the amounts of sodium hydroxide and potassium sulfite employed are slightly in excess of the stoichiometric proportions, whereby the dry solid product contains very small quantities of sodium hydroxide and potassium sulfite dispersed therethrough.

14. The method for preparing alkali metal iodide in solid form which comprises establishing a uniform fluid mixture of water and, in substantially stoichiometric proportions, an alkali metal iodate, and an alkali metal sulfite for reducing said iodate to iodide, at least one of said iodide, and the oxidized derivative of said sulfite, the corresponding alkali metal sulfate, taking up any water present as water of hydration, thereby causing the reaction mixture so formed to set as a dry, solid product.

15. A method for making solid iodide compositions which comprises reaction in substantially stoichiometric proportions a controlled amount of water, iodine, an alkali, and an alkali metal-containing reducing agent, at least one of the constituents of the final products being a salt, formed directly or by metathesis, which is capable of taking up the water as water of crystallization.

16. A method for preparing alkali metal iodide in solid form which comprises contacting water and a member selected from the group consisting of (1) elemental iodine and an alkali metal containing base; (2) an alkali metal containing base; (3) an intermediate reaction product consisting of the iodate resulting from reaction of said iodine and said alkali metal containing base; and (4) elemental iodine, an alkali metal containing base and said intermediate iodate reaction product; said alkali metal containing base, in each instance, being a member selected from the group consisting of alkali metal carbonate, alkali metal bicarbonate and alkali metal hydroxide; with a water-soluble, alkali metal containing a reducing agent for reducing at least iodate; and adding to the mixture so formed such of the aforesaid members as are absent therefrom prior to addition of the reducing agent; said members and reducing agent being present in substantially stoichiometric proportions to form alkali metal iodide by an oxidation-reduction procedure; at least one of said iodide and the oxidized reducing agent taking up water present as water of hydration.

17. The method of claim 16 wherein both said alkali metal containing base and said reducing agent are employed in a slight excess, and the dry solid product contains small stabilizing quantities of said alkali metal containing base and said reducing agent in unreacted form.

18. The method of claim 16 comprising the additional step of heating the dry solid product to remove at least a substantial proportion of the water of hydration therefrom.

19. A method for preparing alkali metal iodide in solid form which comprises contacting water and a member selected from the group consisting of (1) elemental iodine and an alkali metal containing base, (2) an alkali metal containing base, (3) the intermediate reaction product consisting of an iodate resulting from the reaction of said iodine and said alkali metal containing base, and (4) elemental iodine, an alkali metal containing base and said intermediate iodate reaction product; said alkali metal containing base, in each instance, being selected from the group consisting of alkali metal carbonate, alkali metal bicarbonate and alkali metal hydroxide; with a water-soluble alkali metal containing reducing agent for said iodine and the aforesaid iodate which is also substantially soluble in water; and adding to the mixture so formed such of the aforesaid members as are absent therefrom prior to addition of said reducing agent, said members and reducing agent being present in substantially stoichiometric proportions to form alkali metal iodide by an oxidation-reduction procedure; at least one of said iodide and the oxidized reducing agent containing a sodium moiety as its alkali metal constituent, said sodium containing compound of said iodide and the oxidized reducing agent taking up as water of hydration the aqueous phase of the reaction mixture, to produce a hard, dry solid composition.

20. A method for preparing alkali metal iodide in solid form which comprises contacting water and a member selected from the group consisting of (1) elemental iodine and an alkali metal containing base; (2) an alkali metal containing base, (3) the intermediate reaction product consisting of an iodate resulting from reaction of said iodine and said alkali metal containing base, and (4) elemental iodine, an alkali metal containing base and said intermediate iodate reaction product; said alkali metal containing base, in each instance, being selected from the group consisting of alkali metal carbonate, alkali metal bicarbonate and alkali metal hydroxide; with an alkali metal sulfite for reducing said iodine and the aforesaid iodate to iodide, and adding thereto such of the aforesaid members as are absent therefrom prior to addition of the reducing agent, said members and alkali metal sulfite being present in substantially stoichiometric proportions to form alkali metal iodide by an oxidation-reduction procedure; at least one of said iodide and the sulfate derivative of the aforesaid alkali metal sulfite containing a sodium moiety as its alkali metal constituent; each sodium containing compound of said iodide and said sulfate taking up as water of hydration the aqueous phase of the reaction mixture, to produce a hard, dry, non-hydroscopic solid therefrom.

21. A method for preparing alkali metal iodide in solid form which comprises contacting water and a member selected from the group consisting of (1) elemental iodine and an alkali metal containing base, (2) an alkali metal containing base, (3) the intermediate reaction product consisting of an iodate resulting from reaction of said iodine and said alkali metal containing base, and (4) elemental iodine, an alkali metal containing base and said intermediate iodate reaction product; said alkali metal containing base, in each instance, being selected from the group consisting of alkali metal carbonate, alkali metal bicarbonate and alkali metal hydroxide; with sodium sulfite as a reducing agent; and subsequently adding to the mixture so formed such of the members as are absent therefrom prior to addition of said reducing agent, said members and sodium sulfite being present in substantially stoichiometric proportions to form alkali metal iodide and sodium sulfate by oxidation-reduction; and allowing the resulting reaction mix to set to a hard, dry solid.

22. A method for preparing alkali metal iodide in solid dry form which comprises forming a mixture of elemental iodine, an alkali metal hydroxide and water, to form a reaction product mixture containing an alkali metal iodide and alkali metal iodate; and introducing therein an alkali metal sulfite to reduce the iodate to the corresponding iodide and to cause oxidation of said sulfite to the corresponding sulfate; at least one of said iodide and said sulfate taking up as water of hydration the aqueous phase of the resulting reaction mixture; and each of said iodine, alkali metal hydroxide and alkali metal sulfite being introduced in substantially stoichiometric proportions to cause said reaction mixture to form a dry solid.

23. A method for preparing alkali metal iodide in solid form which comprises admixing water and at least one member selected from the group consisting of elemental iodine; an alkali metal containing base; an intermediate reaction product consisting of the iodate resulting from reaction of said elemental iodine and said alkali metal containing base; and a water-soluble, alkali metal containing reducing agent capable of reducing at least said iodate; said alkali metal containing base, in each instance, being a member selected from the group consisting of alkali metal carbonate, alkali metal bicarbonate and alkali metal hydroxide; and adding thereto said members, exclusive of said intermediate reaction product, in substantially stoichiometric proportions, to form alkali metal iodide by an oxidation-reduction procedure; at least one of said iodide and oxidized reducing agent taking up any water present as water of hydration.

24. As a new composition of matter, a solid hydrated mass consisting essentially of a conglomerate of an alkali metal iodide selected from the group consisting of sodium iodide and potassium iodide; and at least one alkali metal sulfate selected from the group consisting of sodium sulfate and potassium sulfate, said iodide and said sulfate being hardened into a solid by hydrated crystals of at least one of said constituents.

25. As a new composition of matter, a solid hydrated mass consisting essentially of an alkali metal iodide and oxidized alkali metal reducing agent; at least one of said iodide and said reducing agent containing sodium as the alkali metal moiety thereof.

26. As a new composition of matter, a hydrated solid mass consisting essentially of an alkali metal iodide and an alkali metal sulfate; at least one member of said iodide and said sulfate containing sodium as the alkali metal moiety thereof; and said composition further containing small stabilizing quantities of an alkali and an alkali metal sulfite dispersed molecularly therethrough.

27. As a new composition of matter, a hydrated solid mass consisting essentially of an alkali metal iodide, sodium sulfate, and small stabilizing quantities of an alkali and sodium sulfite dispersed molecularly therethrough.

28. As a new composition of matter, a hydrated solid mass consisting essentially of sodium iodide, potassium sulfate and small stabilizing quantities of an alkali and potassium sulfite dispersed molecularly therethrough.

References Cited in the file of this patent

UNITED STATES PATENTS

| | | |
|---|---|---|
| 1,557,266 | Moore | Oct. 13, 1925 |
| 1,661,640 | Van Allen | Mar. 6, 1928 |
| 1,789,565 | Sachs | Jan. 20, 1931 |
| 1,918,622 | Meulen | July 18, 1933 |
| 2,800,390 | Behrman | July 23, 1957 |
| 2,918,400 | Loonam | Dec. 22, 1959 |
| 3,058,875 | Goodenough | Oct. 16, 1962 |

OTHER REFERENCES

Hendrixson: J. Amer. Chem. Soc., 47, pp. 1319–25 (1925).

Ricci: J. Amer. Chem., 58, 1077–79, (1936).

Mellor: Modern Inorganic Chemistry, p. 312, Longmans, Green and Co. (1939).